United States Patent [19]
Taguchi et al.

[11] Patent Number: 5,811,024
[45] Date of Patent: Sep. 22, 1998

[54] PREPARATION OF ANISOTROPIC HEXAGONAL BARIUM FERRITE SINTERED MAGNET

[75] Inventors: Hitoshi Taguchi, Chiba; Fumihiko Hirata, Shizuoka; Taku Takeishi; Teruo Mori, both of Chiba, all of Japan

[73] Assignee: TDK Corporation, Tokyo, Japan

[21] Appl. No.: 670,069

[22] Filed: Jun. 25, 1996

[30] Foreign Application Priority Data

Jun. 26, 1995 [JP] Japan .................................. 7-182081

[51] Int. Cl.$^6$ ........................................................ H01F 1/10
[52] U.S. Cl. ................................ 252/62.63; 252/62.62; 252/62.59
[58] Field of Search ..................... 252/62.62, 62.59, 252/62.63; 423/593

[56] References Cited

FOREIGN PATENT DOCUMENTS 58-9303  1/1983  Japan .................... 252/62.63

Primary Examiner—Melissa Bonner
Attorney, Agent, or Firm—Oblon, Spivak, McClelland, Maier & Neustadt, P.C.

[57] ABSTRACT

An anisotropic hexagonal barium ferrite sintered magnet is prepared by molding a powder barium ferrite raw material in a magnetic field into a compact and sintering the compact; or by molding a powder barium ferrite raw material in a magnetic field into a compact, disintegrating the compact into particles, compacting the particles in a magnetic field into a second compact, and sintering the second compact. In either case, the raw material contains calcined hexagonal barium ferrite, a silicon component, and a barium component. The resulting anisotropic hexagonal barium ferrite sintered magnet has improved sintered density and coercivity while the method minimizes deformation during sintering which is otherwise caused by the difference between the shrinkage factors in axis c and a directions, and simplifies or omits post-treatment like polishing.

12 Claims, 3 Drawing Sheets

PREPARATION OF ANISOTROPIC HEXAGONAL BARIUM FERRITE SINTERED MAGNET

BACKGROUND OF THE INVENTION

1. Field of the Invention

This invention relates to a method for preparing an anisotropic hexagonal barium ferrite sintered magnet, typically a polar anisotropy magnet.

2. Prior Art

Currently, hexagonal strontium and barium ferrites of the magnetoplumbite type (M type) are mainly used as oxide permanent magnet materials and they are manufactured into sintered magnets and bonded magnets. Strontium or barium ferrite sintered magnets are prepared by blending and mixing $Fe_2O_3$ and $SrCO_3$ or $BaCO_3$ source materials, calcining, pulverizing, compacting in a magnetic field, and firing. In the process, it is a common practice to add $CaCO_3$ and $SiO_2$ together as shown in Examples of JP-A 291901/1991 and 5802/1992, for example.

Hexagonal barium ferrite is advantageous in reducing manufacture cost because $BaCO_3$ used as the source material is less expensive than $SrCO_3$ for strontium ferrite. However, hexagonal barium ferrite sintered magnets are less likely to offer high coercivity (iHc) since their crystal magnetic anisotropy is about 10% less than that of strontium ferrite. Therefore, hexagonal strontium ferrite sintered magnets are used in products which require iHc of at least 3 kOe, for example.

On the other hand, when $CaCO_3$ and $SiO_2$ are added together during preparation of strontium or barium ferrite sintered magnets as in the prior art, the shrinkage factor during sintering is significantly different between axis c and a directions, with the shrinkage ratio of axis c direction/axis a direction reaching about 2.1 at maximum. As a result, shrinkage during sintering causes substantial deformation, which imposes the necessity to design the mold by previously taking into account a deformation amount or to carry out substantial post-working like polishing and machining, for example, resulting in an increased manufacture cost.

A polar anisotropy ring magnet is known as a typical magnet that experiences substantial deformation due to such differential shrinkage factor. This magnet is of ring shape with its inner or outer circumferential surface being strongly magnetized in multiple poles and finds use in stepper motors or the like. In preparing the ring magnet, a ring-like molded body is formed while alternating poles are arranged around its circumferential surface to effect magnetic field orientation for orienting axis c, and it is then sintered. However, since the body has great anisotropy of shrinkage factor as mentioned above, the circumferential surface is deformed. Ridges developed on the circumferential surface must be ground away and hence, a substantial grinding allowance must be furnished.

DISCLOSURE OF THE INVENTION

A primary object of the present invention is to provide a method for preparing an anisotropic hexagonal barium ferrite sintered magnet, especially a polar anisotropy magnet, having improved sintered density and coercivity, which method minimizes deformation during sintering which is otherwise caused by the difference between the shrinkage factors in axis c and a directions, and simplifies or omits post-treatment like polishing.

To achieve this and other objects, the present invention in a first aspect provides a method for preparing an anisotropic hexagonal barium ferrite sintered magnet comprising the steps of molding a powder barium ferrite raw material in a magnetic field into a compact and sintering the compact. In a second aspect, the present invention provides a method for preparing an anisotropic hexagonal barium ferrite sintered magnet comprising the steps of molding a powder barium ferrite raw material in a magnetic field into a compact, disintegrating the compact into particles, compacting the particles in a magnetic field into a second compact, and sintering the second compact. In either aspect, the raw material contains calcined hexagonal barium ferrite, a silicon component which is silicon oxide or a compound capable of forming silicon oxide upon firing, and a barium component which is barium oxide or a compound capable of forming barium oxide upon firing.

In one preferred embodiment, the silicon component and the barium component are contained in the compact such that the silicon component and the barium component occupy 0.1 to 2.0% by weight and 0.5 to 7% by weight of the compact when they are calculated as $SiO_2$ and $BaCO_3$, respectively, and the molar ratio of the barium component to the silicon component is between 0.5/1 and 3/1 calculated as $BaCO_3/SiO_2$.

The anisotropic hexagonal barium ferrite sintered magnet prepared by the inventive method includes a primary phase of barium ferrite and a grain boundary, the grain boundary having a silicon content which is 2 to 100 times the silicon content within primary phase grains and a barium content which is 1.1 to 20 times the barium content within primary phase grains. The sintered magnet has a shrinkage factor Shc in axis c direction and a shrinkage factor Sha in axis a direction, with the ratio of Shc/Sha ranging between 0.5/1 and 1.5/1. Also preferably, the anisotropic hexagonal barium ferrite sintered magnet includes a grain boundary having a barium content of 0.5 to 10 at %.

In another preferred embodiment, the powder barium ferrite raw material further contains a strontium component which is strontium oxide or a compound capable of forming strontium oxide upon firing. The silicon component and the strontium component are preferably contained in the compact such that the silicon component and the strontium component occupy 0.1 to 2.0% by weight and 0.5 to 5% by weight of the compact when they are calculated as $SiO_2$ and $SrCO_3$, respectively, and the molar ratio of the strontium component to the silicon component is between 0.5/1 and 3/1 calculated as $SrCO_3/SiO_2$. Then the anisotropic hexagonal barium ferrite sintered magnet prepared by the inventive method includes a grain boundary having a strontium content which is 1.1 to 20 times the strontium content within primary phase grains. Preferably the anisotropic hexagonal barium ferrite sintered magnet includes a grain boundary having a silicon content of 2 to 30 at %.

With respect to size, the powder barium ferrite raw material should preferably have a mean particle size of up to 1 $\mu m$; and the anisotropic hexagonal barium ferrite sintered magnet includes a primary phase which should preferably have a mean grain size of up to 1.0 $\mu m$ in axis a direction.

Further preferably, the anisotropic hexagonal barium ferrite sintered magnet is a polar anisotropy hexagonal barium ferrite sintered magnet having a peripheral surface which is oriented in multiple poles.

BENEFITS

The hexagonal barium ferrite sintered magnet prepared by the inventive method has improved sintered density and coercivity. In particular, it has coercivity comparable to that of conventional strontium ferrite sintered magnets while reducing the cost of raw material. Since the ratio of the shrinkage factor in axis c direction to the shrinkage factor in axis a direction (Shc/Sha) is approximate to unity, minimal deformation will occur during sintering so that polishing and other post-working steps may be simplified or omitted. This ensures outstanding advantages upon manufacture of polar anisotropy ring magnets requiring special orientation.

BRIEF DESCRIPTION OF THE DRAWINGS

FIG. 1 is a graph showing the distribution of grain size in axis a direction.

ILLUSTRATIVE CONSTRUCTION

The anisotropic hexagonal barium ferrite sintered magnet prepared by the method of the present invention contains a primary phase of hexagonal barium ferrite and preferably has a final composition of $BaO \cdot nFe_2O_3$ wherein n is 4.5 to 6.5. It may further contain Pb, Al, Ga, Sn, Zn, In, Co, Ni, Ti, Cr, Mn, Cu, Ge, Nb, Zr, Cr, La, Nd, Sm, Pr, Ce, Li, etc. in an amount of up to 5 at % of the entirety. Also less than 50 at %, for example, 0 to 40 at %, especially 0 to 5 at % of Ba may be replaced by Sr.

The anisotropic hexagonal barium ferrite sintered magnet contains either Si and Ba or Si, Ba, and Sr as grain boundary components. The "grain boundary" used herein is generally known as a boundary region where a solid solution is formed (also known as a grain boundary region or phase boundary region) or an intergranular region containing intergranular precipitates, intergranular phases, and intergranular inclusions. The grain boundary components used herein indicate those elements whose concentration in the grain boundary is higher than their concentration within grains. In the practice of the invention, when magnets are prepared by adding Si, Ba and Sr components to calcined barium ferrite powder, followed by molding and sintering, these Si, Ba and Sr components become grain boundary components. The presence of Si, Ba and Sr as grain boundary components can be confirmed by various methods although the following method is preferred for precise and consistent measurement.

Figure 3:
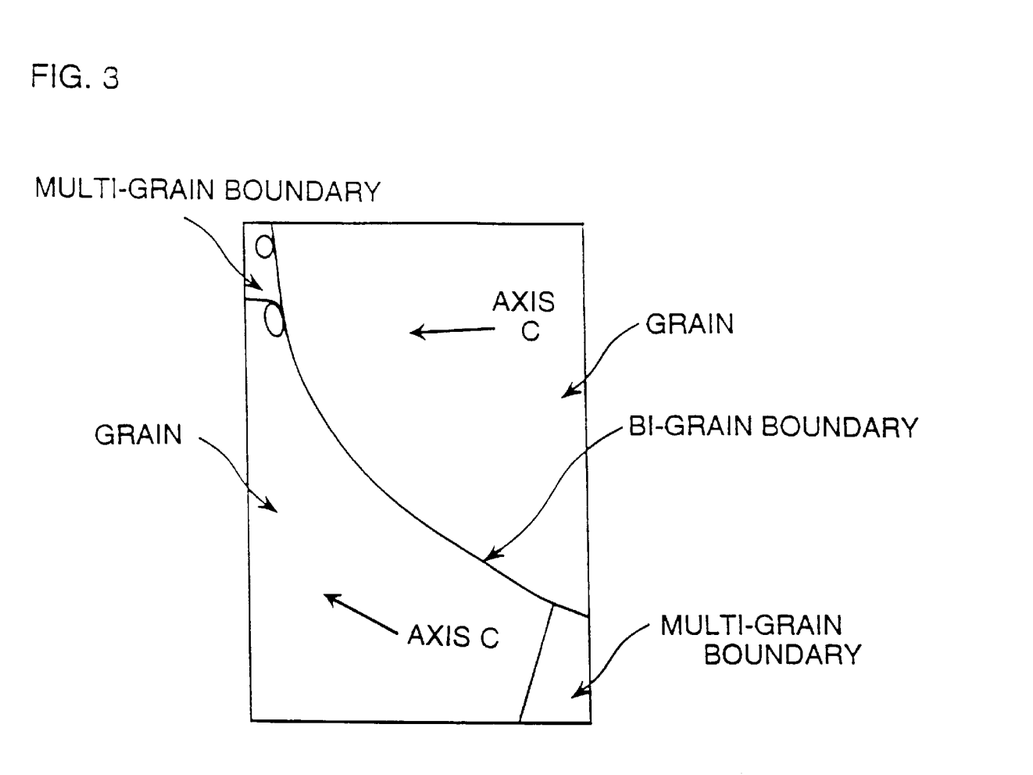
FIG. 3 is a schematic illustration of the TEM photograph of FIG. 2.
Figure 4:
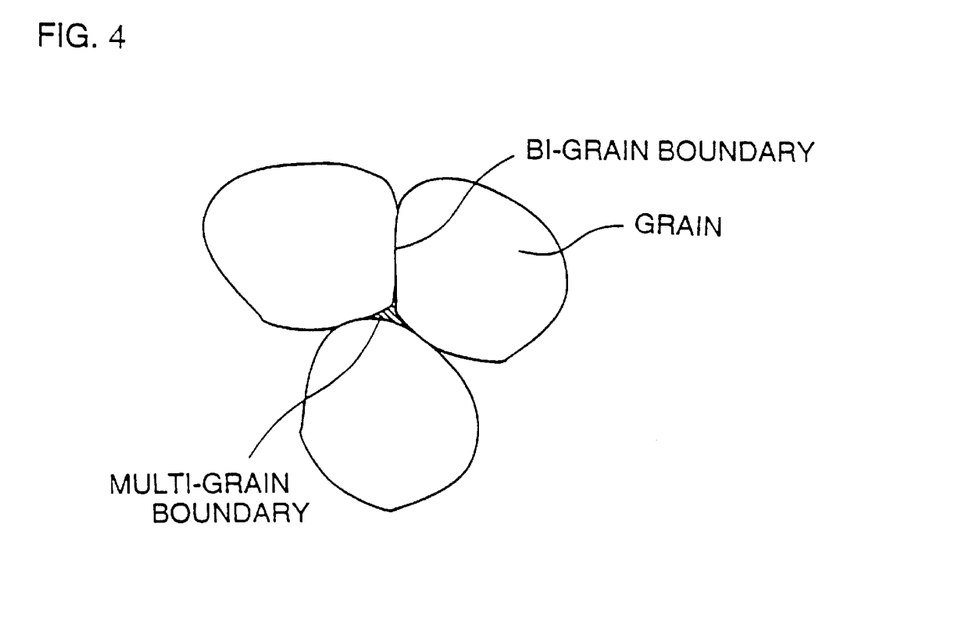
FIG. 4 is a schematic view illustrating a multi-grain boundary.

The preferred method is analytical electron microscopy capable of simultaneously performing observation under a transmission electron microscope (TEM) and local analysis by energy dispersive X-ray spectroscopy (EDS). In this method utilizing TEM-EDS, a thin magnet piece prepared by polishing is used as a sample to be measured. A grain boundary phase and a ferrite phase in grains can be readily distinguished in a crystal structure image. The grain boundary phase is not present at a uniform thickness around grains, but concentrated especially at a multi-grain boundary. The multi-grain boundary designates a grain boundary among three or more grains, for example, a grain boundary among three grains (triple point) as shown in the TEM photograph of FIG. 2 and the illustration of FIG. 4. It is noted that the schematic illustration of FIG. 3 will help understand the detail of the TEM photograph of FIG. 2. For the composition analysis of a grain boundary, measurement is preferably done at such a multi-grain boundary. Since a bi-grain boundary which appears at a boundary between two grains has a grain boundary phase of reduced thickness, accurate determination of grain boundary components by EDS local analysis is difficult. In the case of an anisotropic sintered body having grains oriented wherein the grain boundary includes two types, a and c-plane grain boundaries, measurement may be done along either grain boundary.

The grain boundary preferably has a silicon content $Si_O$ of 2 to 30 at %, more preferably 5 to 25 at % as determined by the above-mentioned method. $Si_O$ divided by the silicon content $Si_I$ of the grain interior (that is, $Si_O/Si_I$) is preferably from 2 to 100, more preferably from 10 to 80. On the other hand, the grain boundary preferably has a barium content $Ba_O$ of 0.5 to 10 at %, more preferably 1 to 8 at %. $Ba_O$ divided by the barium content $Ba_I$ of the grain interior (that is, $Ba_O/Ba_I$) is preferably from 1.1 to 20, more preferably from 1.5 to 5.

When a strontium component is added to calcined barium ferrite along with the silicon and barium components, the grain boundary preferably has a strontium content $Sr_O$ of 0.5 to 8 at %, more preferably 1 to 4 at %. $Sr_O$ divided by the strontium content $Sr_I$ of the grain interior (that is, $Sr_O/Sr_I$) is preferably from 1.1 to 20, more preferably from 3 to 15.

Where a strontium component is not added to calcined barium ferrite powder, but the calcined barium ferrite powder originally contains strontium, the strontium content $Sr_O$ of the grain boundary is approximately equal to the strontium content $Sr_I$ of the grain interior, that is, $Sr_O/Sr_I$ is less than 1.1.

In the magnet according to the invention, the grain boundary preferably has an average thickness of about 20 to 300 Å, more preferably about 40 to 200 Å. Also the primary phase has a mean grain size of up to 1 μm, especially about 0.5 to 1.0 μm as measured in axis a direction. The grain size is determined by means of a scanning electron microscope (SEM).

Such barium ferrite sintered magnets generally have a coercivity iHc of at least 2.5 kOe, especially 3 to 4.0 kOe. As compared with the iHc of conventional magnets having Ca and Si added together, a coercivity improvement of about 10 to 25% is accomplished with the same additive content. It is noted that Br is about 4.1 to 4.4 kG. The ratio of shrinkage factor in axis c direction to shrinkage factor in axis a direction (Shc/Sha) can be approximate to unity although it is generally between 0.5/1 and 1.5/1, especially between 0.7/1 and 1.3/1.

Such hexagonal barium ferrite sintered magnets are prepared by (a) molding a powder barium ferrite raw material in a magnetic field into a compact and (b) sintering the compact. Alternatively, the magnets are prepared by (a) molding a powder barium ferrite raw material in a magnetic field into a compact, (c) disintegrating the compact into particles, (d) compacting the particles in a magnetic field into a second compact, and (e) sintering the second compact. In either embodiment, the powder barium ferrite raw material contains (1) calcined hexagonal barium ferrite, (2) a silicon component which is silicon oxide or a compound capable of forming silicon oxide upon firing, and (3) a barium component which is barium oxide or a compound capable of forming barium oxide upon firing.

The calcined hexagonal barium ferrite is generally available in powder form and is further pulverized before use.

The silicon component is preferably contained such that the silicon component may occupy 0.1 to 2.0% by weight, more preferably 0.2 to 1.5% by weight, most preferably 0.3 to 1.0% by weight of the compact when it is calculated as $SiO_2$. The barium component is preferably contained such that the barium component may occupy 0.5 to 7% by weight, more preferably 1 to 5% by weight, most preferably 1.5 to 3% by weight of the compact when it is calculated as $BaCO_3$. The molar ratio of the barium component to the silicon component is preferably between 0.5/1 and 3/1, more preferably between 0.7/1 and 2.5/1, most preferably between 0.9/1 and 2/1, calculated as $BaCO_3/SiO_2$. Also, the strontium component, if any, is preferably contained such that the strontium component may occupy 0.5 to 5% by weight, more preferably 1.0 to 2.5% by weight, most preferably 1.2 to 2.2% by weight of the compact when it is calculated as $SrCO_3$. The molar ratio of the strontium component to the silicon component is preferably between 0.5/1 and 3/1, more preferably between 0.7/1 and 2.5/1, most preferably between 0.9/1 and 2.0/1, calculated as $SrCO_3/SiO_2$. The addition of these components in the above-specified ranges is effective for improving coercivity and results in a shrinkage factor in axis c direction being approximately equal to a shrinkage factor in axis a direction.

The silicon component serves as nuclei for grain boundary components. Outside the above-defined range, larger amounts of the silicon component would increase a non-magnetic phase and result in lower Br whereas smaller amounts of the silicon component would render grain growth during firing uncontrollable, resulting in lower iHc.

If the amount of the barium component and $BaCO_3/SiO_2$ ratio are outside the above-defined ranges, there would result lower iHc and a shrinkage factor ratio (Shc/Sha) far from 1.

The calcined one of hexagonal barium ferrite used herein is prepared by mixing predetermined amounts of iron oxide powder and barium-containing powder as raw material powders, and calcining the mixture. The barium-containing powder used herein is not critical insofar as it is an oxide or a compound capable of converting into an oxide upon firing, for example, carbonate, hydroxide and nitrate. Typically a carbonate is used. The mean particle size of these raw material powders is not critical. The preferred iron oxide powder is a fine powder, preferably of primary particles having a mean particle size of less than about 1 $\mu$m, especially less than about 0.5 $\mu$m. In addition to the above-mentioned raw material powders, at least one of Sr, Pb, La, Nd, Sm, Pr, Ce, Al, Ga, Cr, Sn, Zn, In, Co, Ni, Ti, Cr, Mn, Cu, Ge, Nb, Zr, Li, and Si may be added if desired.

In order that submicron ferrite particles be obtained after calcination, the mixing step may be carried out by first wet pulverizing iron oxide and adding an aqueous solution of a water-soluble barium salt thereto in the presence of $Na_2CO_3$ or the like. Then barium carbonate is precipitated and mixed with submicron iron oxide particles with high precision. Alternatively, submicron barium carbonate may be used and thoroughly mixed with iron oxide. The mixture is then washed, dried, and calcined. Calcination may be done in air, for example, at a temperature of about 1,000° to about 1,350° C. for about 1 second to about 10 hours, especially about 1 second to about 3 hours. It is also acceptable to thoroughly pulverize and mix the raw material powders in a dry pulverizer.

Also the calcined powder may be obtained by grinding and mixing iron oxide powder and barium-containing powder as source materials, heat treating the mixture under such conditions that an intermediate phase consisting of Ba-richer oxide than the calcined powder composition (e.g., $BaFe_2O_4$ and $BaFeO_{3-x}$ wherein $0 \leq x < 1$) may be created, further grinding the mixture containing the intermediate phase, and calcining it.

The thus obtained calcined powder has a ferrite structure of substantially the magnetoplumbite type, with its primary particles preferably having a mean particle size of up to 1 $\mu$m, more preferably 0.1 to 1 $\mu$m, especially 0.1 to 0.5 $\mu$m. The particle size may be determined by means of a scanning electron microscope (SEM). It preferably has a saturation magnetization σs of 65 to 69 emu/g and a coercive force iHc of 4,000 to 6,000 Oe.

Next, the calcined powder is pulverized. Although the present invention requires that the Si, Ba, and Sr components be added in the above-defined ranges, it is satisfactory if these components be present prior to magnetic field compaction. Then their addition may be done at any stage from pulverization of the calcined powder to compaction. Preferably they are added during pulverization of the calcined powder, especially at an initial stage of the pulverization step. Most often, the Si component is $SiO_2$, the Ba component is $BaCO_3$, and the Sr component is $SrCO_3$. Also compounds with silicon may be used. When they are added in powder form, the particle size is preferably about 0.01 to 5 $\mu$m.

Preferably the step of pulverizing the calcined powder is carried out such that crystal strains may be introduced into the calcined powder for reducing bHc. If the calcined particles are particulated into single magnetic domain particles with resultant increases of iHc and bHc, magnetic forces act between particles to assist in agglomeration of ferrite particles, consequently precluding anisotropy from being induced by a magnetic field. The attractive force or cohesive force between ferrite particles is proportional to the square of the magnetic flux density at the particle surface. As bHc in a hysteresis loop of one ferrite particle increases, the surface magnetic flux density is greater and consequently, the cohesive force becomes greater. Accordingly, for the purpose of weakening the cohesive force of ferrite particles, it is advantageous to introduce crystal strains to reduce bHc for thereby reducing the squareness in the second quadrant. A higher degree of orientation is then available during magnetic field orientation. The strains introduced into the particles are removed during the firing step after the magnetic field compacting step, resulting in a permanent magnet having superior magnetic properties.

The iHc reduction of barium ferrite particles by the introduction of crystal strains is accompanied by an additional advantage that the change of iHc with temperature is reduced. Specifically, a temperature coefficient of iHc decreases to about 1 to 6 Oe/°C. in the range between $-100°$ C. and $+150°$ C. Then the stressed particles as such can also be used as magnetic powder for magnetic recording media.

For introducing such crystal strains, mechanical pulverization is effective. Such pulverization is preferably accomplished, for example, by first performing dry pulverization to introduce sufficient crystal strains. The pulverizing machine used in dry pulverization may be selected from dry vibratory mills, dry attritors (media agitating mills) and dry ball mills, with the dry vibratory mills being preferably used.

Dry pulverization is continued until a BET specific surface area is increased 2 to 10 times, thereby introducing about $3 \times 10^{-4}$ to $7 \times 10^{-4}$ of crystal strains in (206) plane. The powder as dry pulverized has a mean particle size of about 0.1 to 1 $\mu$m and a BET specific surface area of about 4 to 10 $m^2/g$.

Next the dry pulverized powder is generally subject to wet pulverization. Wet pulverization is continued until a BET specific surface area is increased about 1 to 4 times, especially about 1 to 3 times, whereby the powder has a mean particle size of about 0.1 to 0.8 μm and a BET specific surface area of about 6 to 12 m²/g. This wet pulverization also increases crystal strains and the final ferrite particles are adjusted to the above-mentioned value of Hc at a strain amount of at least $10^{-4}$. Since such a strain amount and Hc can be achieved solely by wet pulverization with the dry pulverization omitted, pulverization may be wet pulverization alone. Inversely only dry pulverization may be used. At the end of pulverization, the powder has σs of about 50 to 67 emu/g. For such wet pulverization, ball mills, attritors and vibratory mills are preferably used.

The solvent used in wet pulverization may be an aqueous solvent such as water although the present invention favors use of a non-aqueous solvent as a slurry medium during wet pulverization. The non-aqueous solvents used herein are organic compounds which are liquid at room temperature, typically organic solvents. The solvents which can be used herein include hydrocarbons, for example, heptane, industrial gasoline, kerosine, cyclohexane, toluene, xylene, ethylbenzene, and turpentine oil; halogenated hydrocarbons, for example, 1,2-dibromoethane, tetrachloroethylene, perchloroethylene, dichloropentane, and monochlorobenzene; monohydric alcohols, phenols and ethers, for example, methanol, ethanol, n-propyl alcohol, n-butyl alcohol, cyclohexanol, phenol, and n-butyl ether; acids and esters, for example, butyl acetate; polyhydric alcohols and ethers and esters thereof, for example, ethylene glycol; aldehydes, acetals and ketones, for example, acetone, methyl ethyl ketone, methyl isobutyl ketone, and cyclohexanone; silicone fluids, for example, low viscosity silicone fluid; nitrogenous compounds, for example, ethylene diamine; sulfur compounds, for example, carbon disulfide; and paint thinners, for example, lacquer thinners, and mixtures thereof. The non-aqueous solvent alone or a mixture of such solvents preferably has a viscosity of 0.3 to 3 centipoise at 20° C., more preferably 0.3 to 2.0 centipoise at 20° C., especially 0.4 to 1.5 centipoise at 20° C. because ease of compaction and the degree of orientation of a compact are significantly improved. Preferably the non-aqueous solvent has a vapor pressure of 0.1 to 200 mmHg at 20° C., more preferably 1 to 200 mmHg at 20° C. and a boiling point of 50° to 300° C., more preferably 50° to 200° C. Also during wet pulverization, the non-aqueous solvent should preferably occupy about 10 to 90% by weight of the slurry while the amount of ferrite particles in the slurry is 10 to 90% by weight.

In such wet pulverization, at least one surfactant is preferably added to the slurry. The amount of surfactant added is preferably 0.1 to 5.0% by weight, especially 0.3 to 3.0% by weight based on the source powder. The surfactant is generally amphiphatic in that it can adsorb to the surface of ferrite particles or source powder in the slurry and in adsorbed state, be solubilized in the non-aqueous solvent. Namely, the surfactant generally has a hydrophilic group which can adsorb to the surface of ferrite particles and a lipophilic (or hydrophobic) group which is soluble in the non-aqueous solvent used. It is preferred that the solubility parameter (SP) of the surfactant used is close to the solubility parameter (SP) of the non-aqueous solvent used. It is also preferred that substantially the entire amount of the surfactant added adsorbs to the source powder in the slurry. Such adsorption and solubilization cause micelle formation so that primary particles effectively disperse in the slurry after wet pulverization so that a significant improvement in degree of orientation is achieved upon wet compaction in a magnetic field.

The surfactants used herein include cationic, anionic, non-ionic and ampholytic ones although the preferred surfactant contains at least one of saturated or unsaturated fatty acids having 4 to about 30 carbon atoms or salts thereof, for example, carboxylic acids and salts thereof such as stearic acid, oleic acid, zinc stearate, calcium stearate, strontium stearate, barium stearate, magnesium stearate, aluminum stearate, zinc oleate, calcium oleate, strontium oleate, barium oleate, magnesium oleate, aluminum oleate, and ammonium oleate. Among these, use of calcium salts of fatty acids, especially stearic acid is advantageous because solvent removal during compaction is improved to prevent cracks from occurring in the compact without detracting from a degree of orientation. This is probably because the density of a compact decreases from 3.0 g/cm³ to 2.8 g/cm³ to facilitate solvent removal. Also it is possible that an effective additive element which can be added to ferrite, such as Ca, Ba, Sr, Al, Cr, Ga, Cu, Zn, Mn, Co, and Ti be highly dispersed around ferrite particles by adding an organic material containing such an element (for example, metal salts of organic surfactants such as metal salts of fatty acids). Additionally, there may be used at least one of well-known sulfonic acids and salts thereof; sulfate esters and salts; phosphate esters and salts; aliphatic amine salts or quaternary ammonium salts; aromatic quaternary ammonium salts; pyridinium salts; imidazolinium salts; betaine; aminocarboxylic salts; imidazoline derivatives; and natural surfactants.

When such a surfactant is added to the non-aqueous solvent slurry containing the calcined powder and wet pulverization is performed, the resulting slurry can be directly used for wet compaction. Alternatively, part or the entirety of the surfactant may be added during dry pulverization of the calcined powder which is carried out prior to wet pulverization or alone. Also part or the entirety of the surfactant may be added after wet pulverization of the non-aqueous solvent slurry. Moreover, after dry pulverization, the surfactant and the non-aqueous solvent may be added to prepare a slurry which is subject to wet compaction. Since the surfactant is present in the slurry during its wet compaction in a magnetic field, all these procedures offer an advantage of improving the degree of orientation of a compact. It is noted that the amounts of the surfactant added at plural stages may be determined so that the above-mentioned amount of surfactant added is eventually available in the slurry for wet compaction.

When an aqueous solvent is used for wet pulverization, especially when water or a mixed solvent of water is used from the handling point of view, the source powder occupies about 10 to 70% by weight of the slurry during wet pulverization. However, since no improvement in degree of orientation of a compact is expectable when the water slurry having a surfactant added is subject to wet compaction, solvent replacement from water to a non-aqueous solvent is preferably carried out. The solvent replacement is carried out by subjecting the slurry to decantation with the source powder being magnetically supported. It is noted that this wet compaction may be preceded by dry pulverization.

In this embodiment where wet pulverization using a solvent, preferably aqueous, different from the slurry solvent to be used during wet compaction is followed by solvent replacement, the surfactant should be present in the above-mentioned amount prior to the final wet compaction. To this end, the surfactant may be added at any one of the stages of dry pulverization, wet pulverization, and final slurry preparation. In any case, the final slurry for wet compaction is adjusted to a non-aqueous solvent content of about 5 to 30% by weight and a source particle content of about 70 to 95% by weight.

After the final non-aqueous solvent slurry containing the surfactant is prepared in this way, it is wet compacted in a magnetic field while removing the non-aqueous solvent from the slurry. Solvent removal may be carried out in a conventional manner, for example, by forced removal under vacuum. The compacting pressure is about 0.1 to 0.5 ton/cm$^2$ and the magnetic field applied is about 5 to 15 kG. The resulting compact has a degree of orientation Ir/Is of at least 75%, typically 78 to 86%. Such a high degree of orientation is accomplished only when the non-aqueous solvent and the surfactant are used in combination, but not when the surfactant is added to a water slurry.

Thereafter, the compact is heat treated in air or nitrogen at a temperature of 100° to 500° C. to burn out or decompose away the added surfactant. Then the compact is sintered, for example, in air at a temperature of 1,150° to 1,250° C., especially 1,160° to 1,220° C. for about ½ to 3 hours, obtaining an anisotropic hexagonal barium ferrite sintered magnet of any desired shape.

Alternatively, the compact is disintegrated by a crusher or the like and sieved to collect a fraction of particles having a mean particle size of 100 to 700 μm suitable for magnetic field orientation. The particles are then dry compacted under a magnetic field and similarly sintered, obtaining an anisotropic hexagonal barium ferrite sintered magnet of any desired shape according to the invention.

Also, in the manufacturing method of the present invention, only introduction of mechanical strains can be carried out by pulverization without using the surfactant. In this embodiment, pulverization may be either dry or wet pulverization as mentioned above. In the preferred embodiment wherein wet pulverization is carried out, water or a mixed solvent of water is preferred as the slurry solvent because of ease of handling. On wet pulverization, the solvent preferably occupies about 10 to 90% by weight of the slurry, especially about 30 to 90% by weight of the water slurry, and the ferrite particles occupy about 10 to 90% by weight of the slurry, especially about 10 to 70% by weight of the water slurry.

In the preferred embodiment wherein the water or aqueous slurry is subject to wet pulverization, the slurry may then be subject to wet compaction without further treatment. Also, dry pulverization of calcined powder may be carried out prior to wet compaction as previously mentioned. Further, a solvent may be added after dry pulverization to prepare a slurry for wet compaction. Moreover, the above-mentioned wet pulverization may be carried out in another solvent different from the slurry for compaction and thereafter, the solvent used for pulverization is replaced by water prior to wet compaction. The solvent replacement is carried out, for example, by subjecting the slurry to decantation with the source powder being magnetically supported. It is noted that this wet compaction may be preceded by dry pulverization. In any case, the final slurry for wet compaction is adjusted to a water or solvent content of about 5 to 30% by weight and a source particle content of about 70 to 95% by weight.

Where the aqueous slurry is subject to wet pulverization, a dispersant is preferably added upon pulverization. The dispersant used herein is desirably a polymeric dispersant, especially a polycarboxylic acid ammonium dispersant. The dispersant is added in an amount of 0.1 to 1% by weight of the source powder.

EXAMPLE

Examples and Comparative Examples are given below to further illustrate the present invention.

Example 1 & Comparative Example 1

The raw materials used were 1,000 grams of Fe$_2$O$_3$ powder having a primary particle size of 0.3 μm and 215.5 grams of BaCO$_3$ powder having a primary particle size of 2 μm. The raw materials were milled along with 2 liters of water in a wet attritor for 2 hours for particle size regulation. The mixture was fired in air at 1,175° C. for 3 hours, obtaining a calcined powder. The resulting powder was measured for magnetic properties by a vibrating sample magnetometer (VSM) to find σs=68 emu/g and iHc=4.6 kOe. An observation under a scanning electron microscope (SEM) showed a primary particle size of 0.3 μm and a BET specific surface area of 2 m$^2$/g.

To the calcined powder were added 0.6% by weight of SiO$_2$ having a mean particle size of 0.01 μm and the amount shown in Table 1 of BaCO$_3$ or CaCO$_3$ both having a mean particle size of 1 μm. The mixture was milled in a dry vibratory mill until the ferrite powder reached a specific surface area of 7 m$^2$/g. This process introduced comminution strains into the ferrite powder, causing a reduction of iHc from 4.6 kOe to 2.0 kOe.

Next, the powder was subject to wet milling in a ball mill using xylene as a non-aqueous solvent and oleic acid as a surfactant. Oleic acid was added in an amount of 1.5% by weight based on the powder resulting from the dry milling step. The xylene slurry had a ferrite concentration of 33% by weight. Milling was continued until a specific surface area of 8 m$^2$/g was reached. The powder (powder barium ferrite raw material) in the thus milled slurry was similarly measured for magnetic properties to find σs=64 emu/g and iHc=1.8 kOe. It had a mean particle size of 0.3 μm.

The milled slurry was worked up by suction filtration so that the slurry had a ferrite concentration of 80 to 85% by weight. While removing the solvent from the slurry, the powder was compacted into a cylindrical column having a diameter of 30 mm and a height of 15 mm in a magnetic field of about 13 kG applied in a height direction. The resulting compact had a degree of orientation (Ir/Is) as reported in Table 1.

Next, each compact was fired in air at a temperature of 1,220° C. for one hour. Before firing of the compact, it was fully burned out in air at 100° to 300° C. in order to remove the oleic acid. The resulting sintered body was evaluated for magnetic properties, degree of orientation, squareness ratio Hk/iHc, sintered density, and a shrinkage factor ratio (Shh/Shφ) of shrinkage factor in height direction (axis c direction) to shrinkage factor in diametrical direction (axis a direction). The results are shown in Table 1. It is noted that iHc is a coercive force. Hk is the strength of an external magnetic field when the magnetic flux density is 90% of the residual magnetic flux density in the second quadrant of a magnetic hysteresis loop. Low Hk leads to a low energy product. Hk/iHc serves as an index of magnet performance and indicates a degree of squareness in the second quadrant of a magnetic hysteresis loop. The sharper the distribution of crystal grain size, the greater becomes Hk/iHc.

It is noted that $BaCO_3$=2.96% corresponds to $CaCO_3$=1.50% when calculated in molar percent.

TABLE 1

| Sintered body | Invention No. 1 | Comparison No. 2 |
|---|---|---|
| Amount of $SiO_2$ added (wt %) | 0.6 | 0.6 |
| Amount of $BaCO_3$ added (wt %) | 2.96 | — |
| $BaCO_3/SiO_2$ (molar ratio) | 1.5 | — |
| Amount of $CaCO_3$ added (wt %) | — | 1.50 |
| Compact's degree of orientation Ir/Is (%) | 84.5 | 84.8 |
| Degree of orientation Ir/Is (%) | 96.8 | 97.7 |
| Density (g/cm³) | 5.20 | 5.10 |
| Br (kG) | 4.37 | 4.36 |
| iHc (kOe) | 3.15 | 2.81 |
| Hk/iHc (%) | 95.1 | 91.1 |
| (BH)max (MGOe) | 4.68 | 4.67 |
| Shrinkage factor Shh/Shφ | 0.84 | 2.03 |

As shown in Table 1, sintered body No. 1 in which $BaCO_3$ was added instead of $CaCO_3$ had improved iHc and a shrinkage factor ratio (Shh/Shφ) approaching to 1 despite a higher degree of orientation. A comparison of sintered body Nos. 1 and 2, in which the addition amount is equivalent in molar percent and the firing temperature is equal, show that the sintered density is improved by adding $BaCO_3$ instead of $CaCO_3$. The improvement in sintered density leads to an improvement in mechanical strength.

The invention eliminates a need to increase the barium concentration of calcined powder since $BaCO_3$ is added after calcination. A calcined material having a high concentration of barium includes a M phase ferrite and a barium-rich phase which is decomposable and hence, pulverizable. This allows for generation of fine grits which would adversely affect moldability and be cumbersome to handle. Additionally, since the fine grits are readily dispersible in a solvent and soluble in water, pulverization using an aqueous medium would cause a composition shifting. No such problems arise in sintered body No. 1 prepared according to the invention.

Figure 1A:
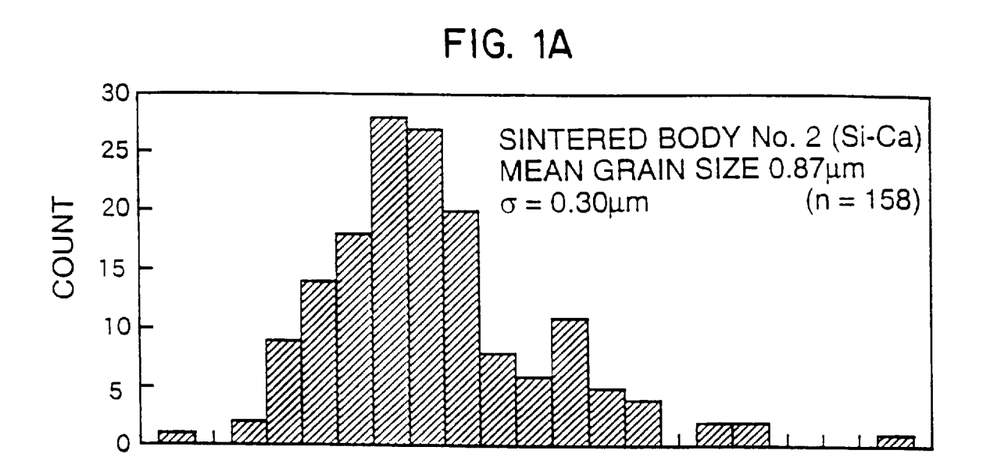
Figure 1B:
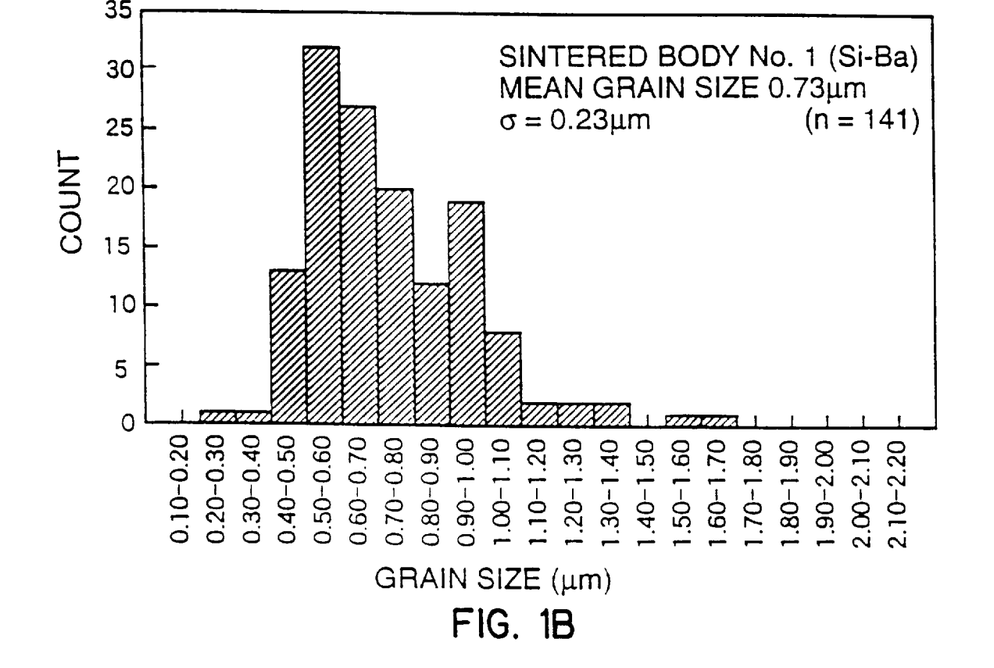
Figure 2:
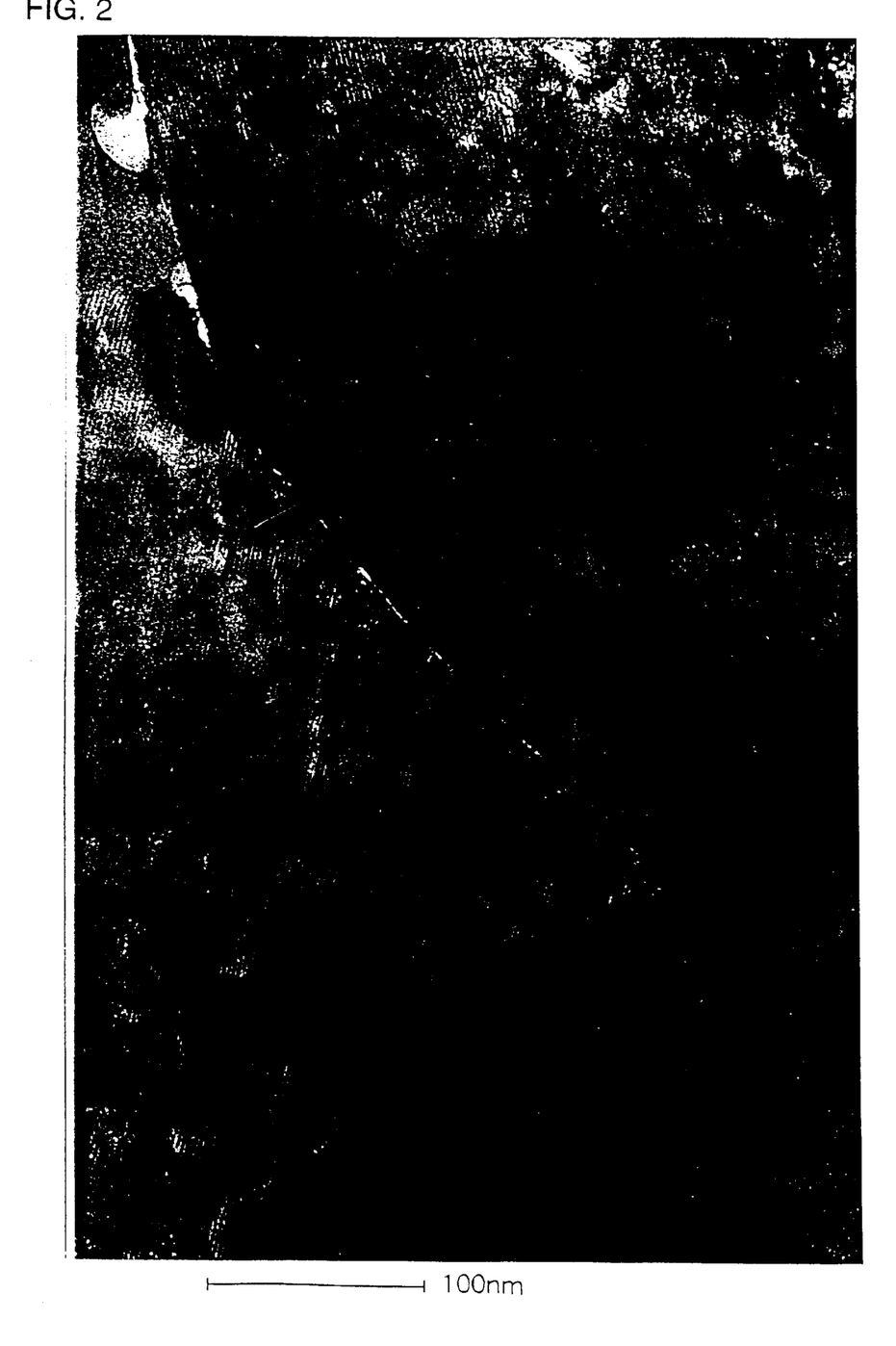
FIG. 2 is a photograph taken through a transmission electron microscope (TEM) showing the crystal structure of an anisotropic hexagonal barium ferrite sintered magnet.

FIG. 2 is a TEM photomicrograph of sintered body No. 1. FIG. 1 shows the distribution of crystal grain size in axis a direction of sintered body Nos. 1 and 2. The crystal grain size was determined from a SEM photomicrograph. It is seen from FIG. 1 that sintered body No. 1 has a crystal grain size controlled to smaller values and a sharp grain size distribution. It is believed that sintered body No. 1 has higher coercivity because of this crystal grain size and distribution.

Analysis by TEM-EDS

A sample for measurement was obtained from sintered body No. 1 by polishing it from opposite surfaces and in parallel with axis c until a thickness of about 100 μm was reached, grinding it to a thickness of about 30 μm by means of Dimple Grinder, and processing it into a thin film by means of a precision argon ion polishing system (PIPS). For at least four areas (N≧4) in each of the multi-grain boundary and the grain interior of each measurement sample, a compositional distribution was examined by TEM-EDS. The TEM used herein was JEM2000FXII manufactured by Nihon Electronics K.K. and the EDS used was TN5450 manufactured by Tracor-Northern. As a result of measurement, sintered body No. 1 was found to have a $Si_O/Si_I$ in the range between 2/1 and 100/1, a $Ba_O/Ba_I$ in the range between 1.1/1 and 20/1, a $Sr_O/Sr_I$ of not greater than 1.1/1.

The effectiveness of the invention is evident from the foregoing example.

Japanese Patent Application No. 182081/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing an anisotropic hexagonal barium ferrite sintered magnet comprising the steps of
    molding a powder barium ferrite raw material in a magnetic field into a compact, said raw material containing calcined hexagonal barium ferrite, a silicon component which is silicon oxide or a compound capable of forming silicon oxide upon firing, and a barium component which is barium oxide or a compound capable of forming barium oxide upon firing, and
    sintering the compact.

2. The method of claim 1 wherein said silicon component and said barium component are contained in the compact such that said silicon component and said barium component occupy 0.1 to 2.0% by weight and 0.5 to 7% by weight of the compact when they are calculated as $SiO_2$ and $BaCO_3$, respectively, and the molar ratio of said barium component to said silicon component is between 0.5/1 and 3/1 calculated as $BaCO_3/SiO_2$.

3. The method of claim 1 wherein the anisotropic hexagonal barium ferrite sintered magnet includes a primary phase of barium ferrite and a grain boundary, the grain boundary having a silicon content which is 2 to 100 times the silicon content within primary phase grains and a barium content which is 1.1 to 20 times the barium content within primary phase grains, and said sintered magnet has a shrinkage factor Shc in axis c direction and a shrinkage factor Sha in axis a direction, with the ratio of Shc/Sha ranging between 0.5/1 and 1.5/1.

4. The method of claim 1 wherein the anisotropic hexagonal barium ferrite sintered magnet includes a grain boundary having a barium content of 0.5 to 10 at %.

5. The method of claim 1 wherein the powder barium ferrite raw material further contains a strontium component which is strontium oxide or a compound capable of forming strontium oxide upon firing.

6. The method of claim 5 wherein said silicon component and said strontium component are contained in the compact such that said silicon component and said strontium component occupy 0.1 to 2.0% by weight and 0.5 to 5% by weight of the compact when they are calculated as $SiO_2$ and $SrCO_3$, respectively, and the molar ratio of said strontium component to said silicon component is between 0.5/1 and 3/1 calculated as $SrCO_3/SiO_2$.

7. The method of claim 5 wherein the anisotropic hexagonal barium ferrite sintered magnet includes a grain boundary having a strontium content which is 1.1 to 20 times the strontium content within primary phase grains.

8. The method of claim 1 wherein the anisotropic hexagonal barium ferrite sintered magnet includes a grain boundary having a silicon content of 2 to 30 at %.

9. The method of claim 1 wherein the powder barium ferrite raw material has a mean particle size of up to 1 μm.

10. The method of claim 1 wherein the anisotropic hexagonal barium ferrite sintered magnet includes a primary phase having a mean grain size of up to 1.0 μm in axis a direction.

11. The method of claim 1 wherein the anisotropic hexagonal barium ferrite sintered magnet is a polar anisotropy hexagonal barium ferrite sintered magnet having a peripheral surface which is oriented in multiple poles.

12. The method of claim 1 which further comprises, instead of the step of sintering the compact, the steps of:

disintegrating the compact into particles, compacting the particles in a magnetic field into a second compact, and sintering the second compact.

* * * * *

UNITED STATES PATENT AND TRADEMARK OFFICE
CERTIFICATE OF CORRECTION

PATENT NO. : 5,811,024

DATED : September 22, 1998

INVENTOR(S) : Hitoshi Taguchi, et al.

It is certified that error appears in the above-identified patent and that said Letters Patent is hereby corrected as shown below:

Column 3, line 5, change "FIG. 1 is a graph" to --FIGS. 1A and 1B are graphs--.

Column 11, line 42, change "FIG. 1 shows" to --FIGS. 1B and 1A show--

Column 11, line 42, change "FIG. 1" to --FIG. 1B--.

Column 11, line 45, change "FIG. 1" to --FIG. 1B--.

Signed and Sealed this

Ninth Day of March, 1999

Attest:

Q. TODD DICKINSON

*Attesting Officer*    *Acting Commissioner of Patents and Trademarks*